(12) United States Patent
Takashima et al.

(10) Patent No.: US 12,331,222 B2
(45) Date of Patent: Jun. 17, 2025

(54) METHOD FOR APPLYING A THREADLIKE ADHESIVE BODY, AND TEMPORARY-SUPPORT-SUPPORTED THREADLIKE ADHESIVE BODY

(71) Applicant: NITTO DENKO CORPORATION, Ibaraki (JP)

(72) Inventors: Atsushi Takashima, Ibaraki (JP); Yosuke Makihata, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 233 days.

(21) Appl. No.: 17/764,034

(22) PCT Filed: Sep. 23, 2020

(86) PCT No.: PCT/JP2020/035860
§ 371 (c)(1),
(2) Date: Mar. 25, 2022

(87) PCT Pub. No.: WO2021/060299
PCT Pub. Date: Apr. 1, 2021

(65) Prior Publication Data
US 2022/0332987 A1    Oct. 20, 2022

(30) Foreign Application Priority Data

Sep. 27, 2019  (JP) ................. 2019-177550

(51) Int. Cl.
*B32B 37/00* (2006.01)
*C09J 7/20* (2018.01)
*C09J 133/08* (2006.01)

(52) U.S. Cl.
CPC ........... *C09J 133/08* (2013.01); *B32B 37/025* (2013.01); *C09J 7/20* (2018.01); *C09J 2301/502* (2020.08)

(58) Field of Classification Search
CPC ...... C09J 7/20; C09J 133/08; C09J 2301/202; C09J 2301/502; B32B 37/025; B32B 37/1292
(Continued)

(56) References Cited

U.S. PATENT DOCUMENTS 5,306,374 A * 4/1994 Hambright ............... D06Q 1/12
156/247
6,010,715 A * 1/2000 Wick ................... A61K 9/7084
424/448

(Continued)

FOREIGN PATENT DOCUMENTS

DE      2127 599 A1   12/1971
GB      1 349 644 A    4/1974
(Continued)

OTHER PUBLICATIONS

International Search Report issued on Dec. 8, 2020, for corresponding International Patent Application No. PCT/JP2020/035860, along with an English translation.

(Continued)

*Primary Examiner* — John L Goff, II
(74) *Attorney, Agent, or Firm* — HAUPTMAN HAM, LLP

(57) ABSTRACT

The present invention relates to a method for applying a threadlike adhesive body to an adherend so that the applied threadlike adhesive body has a desired shape, the method including a step in which a temporary-support-supported threadlike adhesive body including a temporary support and the threadlike adhesive body applied thereto so as to have a shape reverse to the desired shape is applied by press-bonding a surface thereof where the threadlike adhesive body lies to the adherend.

19 Claims, 4 Drawing Sheets

(58) Field of Classification Search
USPC .................. 156/230, 235, 247, 240
See application file for complete search history.

(56) References Cited

U.S. PATENT DOCUMENTS

| | | | |
|---|---|---|---|
| 6,982,107 B1* | 1/2006 | Hennen | C09J 7/40 |
| | | | 428/40.1 |
| 2002/0192415 A1* | 12/2002 | Vogler | B42D 5/005 |
| | | | 428/40.1 |
| 2013/0034677 A1 | 2/2013 | Ujie et al. | |
| 2018/0265750 A1 | 9/2018 | Akamatsu et al. | |
| 2020/0263065 A1 | 8/2020 | Takashima et al. | |
| 2020/0308454 A1 | 10/2020 | Takashima et al. | |
| 2021/0009864 A1 | 1/2021 | Takashima et al. | |
| 2021/0380846 A1 | 12/2021 | Takashima et al. | |
| 2021/0388237 A1 | 12/2021 | Takashima et al. | |

FOREIGN PATENT DOCUMENTS

| | | |
|---|---|---|
| JP | S54-161650 A | 12/1979 |
| JP | H1-308471 A | 12/1989 |
| JP | H3-231980 A | 10/1991 |
| JP | H6-23705 A | 2/1994 |
| JP | H7-21791 U | 4/1995 |
| JP | 2003-113356 A | 4/2003 |
| JP | 2004-2840 A | 1/2004 |
| JP | 2014-214157 A | 11/2014 |
| JP | 5692834 B1 | 4/2015 |
| JP | 2018-44139 A | 3/2018 |
| JP | 2019-65190 A | 4/2019 |
| JP | 2019-65280 A | 4/2019 |
| JP | 6898041 B2 | 7/2021 |
| WO | 03/054100 A1 | 7/2003 |
| WO | 2017/064925 A1 | 4/2017 |
| WO | 2019/065886 A1 | 4/2019 |
| WO | 2019/163788 A1 | 8/2019 |
| WO | 2020/071509 A1 | 4/2020 |

OTHER PUBLICATIONS

Written Opinion issued on Dec. 08, 2020, for corresponding International Patent Application No. PCT/JP2020/035860.
The Extended European Search Report issued on Aug. 30, 2023 for corresponding European Patent Application No. 20868403.5 (8 pages).
Office Action issued on Feb. 9, 2024 for corresponding Chinese Patent Application No. 202080067017.2, along with an English machine translation (21 pages).
Office Action issued on Jul. 27, 2024 for corresponding Chinese Patent Application No. 202080067017.2, along with an English machine translation (23 pages).
Office Action issued on Jun. 13, 2024 for corresponding Taiwanese Patent Application No. 109133479, along with an English machine translation (16 pages).
Office Action issued on Nov. 30, 2024 for corresponding Chinese Patent Application No. 202080067017.2, along with partial English translation (33 pages).
Office Action issued on Nov. 5, 2024 for corresponding Japanese Patent Application No. 2020-159074, along with an English machine translation (8 pages).
Office Action issued on Jan. 17, 2025 for corresponding Taiwanese Patent Application No. 109133479, along with an English translation (7 pages).
Office Action issued on Mar. 25, 2025 for corresponding Japanese Patent Application No. 2020-159074, along with an English machine translation (5 pages).

* cited by examiner

METHOD FOR APPLYING A THREADLIKE ADHESIVE BODY, AND TEMPORARY-SUPPORT-SUPPORTED THREADLIKE ADHESIVE BODY

CROSS REFERENCE TO RELATED APPLICATION

This application is a National Stage of International Application No. PCT/JP2020/035860, filed on Sep. 23, 2020, which designates the United States and was published in Japan, and which is based upon and claims priority to Japanese Patent Application No. 2019-177550, filed on Sep. 27, 2019 in the Japan Patent Office. All of the aforementioned applications are hereby incorporated by reference in their entireties.

TECHNICAL FIELD

The present invention relates to a method for applying a threadlike adhesive body and to a temporary-support-supported threadlike adhesive body.

BACKGROUND ART

There are cases where an adhesive object, e.g., a double-faced adhesive tape, is used in bonding articles.

However, the double-faced adhesive tape has a width usually large to some degree and is hence unsuitable for bonding articles which have a complicated shape or have an adhesion area having a small width. Methods which are thought to render such bonding possible are a method in which a double-faced adhesive tape that has been cut so as to have a small width is used and a method in which a double-faced adhesive tape that has been cut into a desired shape by punching is used.

For example, Patent Document 1 discloses an adhesive film having excellent cuttability, that is, an adhesive film in which the adhesive is inhibited from stringing upon cutting.

CITATION LIST

Patent Literature

Patent Document 1: International Publication WO 2017/064925

SUMMARY OF INVENTION

Technical Problems

However, the double-faced adhesive tape cut to a small width has problems, for example, in that it is unsuitable for bonding curved articles or portions and that it is prone to become twisted and has poor handleability.

The double-faced adhesive tape cut into a desired shape by punching is free from those problems, but has problems, for example, in that the processing requires additional steps and yields a large amount of portions to be discarded, resulting in an increase in cost.

There also is a problem in that although those adhesive tapes are each produced through a step in which the adhesive layer is cut, it is difficult to cut the adhesive layer when the adhesive layer contains hard particles, e.g., a filler.

Examples of methods which overcome the problems described above includes a method in which a threadlike adhesive body is used. The threadlike adhesive body can be bent or deformed in various directions at various angles, is free from the conception of front/back faces and hence from poor handleability due to twisting, and requires no step or cost when formed into a desired shape. Furthermore, since production thereof does not involve cutting of an adhesive layer, it is easy to incorporate hard particles into the adhesive layer.

However, for example, in cases when the threadlike adhesive body is applied so as to form a complicated shape, the application sometimes requires a high degree of technique or a device for application.

An object of the present invention, which has been achieved in view of such circumstances, is to provide a method for applying a threadlike adhesive body, the method being capable of easily applying the threadlike adhesive body in a desired shape, and a temporary-support-supported threadlike adhesive body for use in the application method.

Solution to the Problems

The method for applying a threadlike adhesive body of the present invention, which solves the problems described above, is a method for applying a threadlike adhesive body to an adherend so that the applied threadlike adhesive body has a desired shape, the method including a step in which a temporary-support-supported threadlike adhesive body including a temporary support and the threadlike adhesive body applied thereto so as to have a shape reverse to the desired shape is applied by press-bonding a surface thereof where the threadlike adhesive body lies to the adherend.

One embodiment of the method of the present invention for applying a threadlike adhesive body may further include removing the temporary support from the threadlike adhesive body after the press bonding.

In one embodiment of the method of the present invention for applying a threadlike adhesive body, the temporary support may be removed from the threadlike adhesive body by peeling.

In one embodiment of the method of the present invention for applying a threadlike adhesive body, the threadlike adhesive body may include a threadlike core material and an adhesive layer covering a peripheral surface of the core material.

In one embodiment of the method of the present invention for applying a threadlike adhesive body, the temporary support may have a 5%-strain stress of 20 N or higher.

In one embodiment of the method of the present invention for applying a threadlike adhesive body, a surface of the temporary support to which the threadlike adhesive body is applied may have a peel adhesive force measured by the following peel test of 0.30 N/50 mm or higher.
(Method for Measuring Peel Adhesive Force by Peel Test)

First, 40 parts by weight of ion-exchanged water is introduced into a reaction vessel equipped with a cooling tube, a nitrogen introduction tube, a thermometer, and a stirrer and is stirred at 60° C. for 1 hour or longer while nitrogen gas is being introduced, thereby performing nitrogen displacement.

Next, 0.1 part by weight of 2,2'-azobis[N-(2-carboxyethyl)-2-methylpropionamidine]n-hydrate is introduced into the reaction vessel. A monomer emulsion obtained by adding 98 parts by weight of 2-ethylhexyl acrylate, 1.25 parts by weight of acrylic acid, 0.75 parts by weight of methacrylic acid, 0.05 parts by weight of lauryl mercaptan, 0.02 parts by weight of γ-methacryloxypropyltrimethoxysilane, and 2 parts by weight of polyoxyethylene sodium lauryl sulfate to 30 parts by weight of ion-exchanged water and emulsifying the mixture is gradually introduced dropwise into the reaction vessel over 4 hours while the system is kept at 60° C., thereby allowing an emulsion polymerization reaction to proceed. After completion of the dropwise addition of the monomer emulsion, the system is held at 60° C. for 3 hours and then cooled to room temperature, and 10% by weight ammonia water is subsequently added thereto to adjust the pH of the system to 7, thereby obtaining an acrylic-polymer emulsion (aqueous dispersion type acrylic polymer). Thereafter, a tackifier-resin emulsion (an aqueous emulsion of a polymerized-rosin ester having a softening point of 160° C.) is added thereto in an amount of 10 parts by weight on a solid basis per 100 parts by weight of the acrylic polymer contained in the obtained aqueous dispersion type acrylic polymer. Using 10% by weight ammonia water as a pH regulator and poly(acrylic acid) as a thickener, the resultant mixture is regulated so as to have a pH of 7.2 and a viscosity of 10 Pa·s, thereby obtaining an aqueous dispersion type acrylic adhesive composition.

Thereafter, the obtained aqueous dispersion type acrylic adhesive composition is applied to a PET substrate having dimensions of 700 mm×250 mm and a thickness of 25 μm with an applicator and dried at 100° C. for 2 minutes to form an adhesive layer having a thickness of 40 μm, thereby obtaining an adhesive tape for release-property evaluation.

The surface of the temporary support which is on the reverse side from the surface to which the threadlike adhesive body is applied is bonded to an SUS plate using a double-faced adhesive tape. Thereafter, the adhesive tape for release-property evaluation is cut into a size having a width of 50 mm and a length of 100 mm and is applied and press-bonded, by rolling a 2-kg roller forward and backward once, to the surface of the temporary support to which the threadlike adhesive body is applied. At 20 minutes after the press bonding, the adhesive tape for release-property evaluation is peeled from the temporary support under the conditions of a peel angle of 180° and a peel rate of 300 mm/min to measure the peel adhesive force.

In one embodiment of the method of the present invention for applying a threadlike adhesive body, the surface of the temporary support to which the threadlike adhesive body is applied may be lower in peel adhesive force measured by the peel test than the surface of the adherend to which the threadlike adhesive body is applied.

The temporary-support-supported threadlike adhesive body of the present invention is a temporary-support-supported threadlike adhesive body for use in applying a threadlike adhesive body to an adherend so that the applied threadlike adhesive body has a desired shape,
wherein the temporary-support-supported threadlike adhesive body comprises a temporary support and a threadlike adhesive body applied thereto so as to have a shape reverse to the desired shape, and
a surface of the temporary support to which the threadlike adhesive body is applied has a peel adhesive force measured by the peel test of 0.30 N/50 mm or higher.

In one embodiment of the temporary-support-supported threadlike adhesive body of the present invention, the threadlike adhesive body may include a threadlike core material and an adhesive layer covering a peripheral surface of the core material.

Advantageous Effects of Invention

The present invention provides a method for applying a threadlike adhesive body, the method being capable of easily applying the threadlike adhesive body in a desired shape, and a temporary-support-supported threadlike adhesive body for use in the application method.

DESCRIPTION OF EMBODIMENTS

Figure 1:
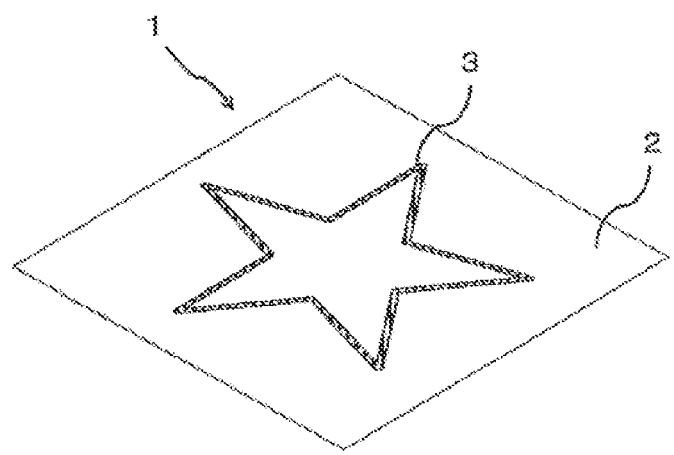
FIG. 1 is a diagrammatic slant view of a temporary-support-supported threadlike adhesive body according to one embodiment of the present invention.

The method of the present invention for applying a threadlike adhesive body is a method for applying a threadlike adhesive body to an adherend so that the applied threadlike adhesive body has a desired shape, the method including a step in which a temporary-support-supported threadlike adhesive body including a temporary support and the threadlike adhesive body applied thereto so as to have a shape reverse to the desired shape is applied by press-bonding a surface thereof where the threadlike adhesive body lies to the adherend.

The temporary-support-supported threadlike adhesive body of the present invention is a temporary-support-supported threadlike adhesive body for use in applying a threadlike adhesive body to an adherend so that the applied threadlike adhesive body has a desired shape, wherein the temporary-support-supported threadlike adhesive body comprises a temporary support and a threadlike adhesive body applied thereto so as to have a shape reverse to the desired shape, and a surface of the temporary support to which the threadlike adhesive body is applied has a peel adhesive force measured by the peel test which will be described later of 0.30 N/50 mm or higher.

Embodiments of the method of the present invention for applying a threadlike adhesive body and embodiments of the temporary-support-supported threadlike adhesive body are explained in detail below.

The present invention is not limited to the embodiments explained below. In the drawings, members and portions having the same function are sometimes designated by like sings, and duplicates of explanation are sometimes omitted or simplified. The embodiments shown in the drawings have been schematized in order to clearly explain the present invention and do not always precisely show the sizes or scales of actual products.

[Threadlike Adhesive Body]

First, a threadlike adhesive body in this embodiment is explained.

The threadlike adhesive body is an adhesive object which has a thread shape and the peripheral surface of which has adhesive properties.

The term "threadlike" means a shape which has a longitudinal-direction length that is sufficiently long as compared with a transverse-direction length thereof and in which a cross-section perpendicular to the longitudinal direction has a shape (hereinafter referred to also as "cross-sectional shape") wherein the proportion of the length of the major axis (the longest of axes passing through the center of gravity of the cross-sectional shape) to the length of the minor axis (the shortest of the axes passing through the center of gravity of the cross-sectional shape), (major axis)/(minor axis), is, for example, 200 or less, preferably 100 or less, more preferably 50 or less, still more preferably 10 or less, yet still more preferably 5 or less, especially preferably 3 or less, and further means a state in which the threadlike adhesive body can be bent in various directions and at various angles like a thread.

The threadlike adhesive body in this embodiment has a cross-sectional shape which is typically circular. However, the cross-sectional shape thereof is not limited thereto, and can be any of various shapes including elliptic and polygonal shapes, besides the circular shape. The length and thickness of the threadlike adhesive body in this embodiment are also not particularly limited and may be suitably regulated in accordance with uses.

The threadlike adhesive body in this embodiment may include a core material and an adhesive layer constituted of an adhesive and covering the peripheral surface of the core material. Alternatively, the threadlike adhesive body may consist of an adhesive only without including a core material. From the standpoints of strength and handleability, the threadlike adhesive body preferably includes a core material.

The threadlike adhesive body consisting of an adhesive only can be obtained, for example, by linearly applying the adhesive to a release liner and optionally heating and drying the applied adhesive.

Meanwhile, the threadlike adhesive body including a core material can be obtained, for example, by applying an adhesive composition to the surface of the core material by dipping, immersion, or another application method and optionally heating and drying the applied adhesive composition. The adhesive composition can be applied using a common coater such as, for example, a gravure roll coater, a reverse-roll coater, a kiss-roll coater, a dip roll coater, a bar coater, a knife coater, or a spray coater.

The kind of the adhesive to be used is not particularly limited, and use can be made, for example, of acrylic adhesives, rubber-based adhesives, vinyl-alkyl-ether-based adhesives, silicone-based adhesives, polyester-based adhesives, polyamide-based adhesives, urethane-based adhesives, fluoropolymer-based adhesives, and epoxy-based adhesives. Preferred of these from the standpoint of adhesive property are rubber-based adhesives and acrylic adhesives. Acrylic adhesives are especially preferred. One adhesive may be used alone, or two or more adhesives may be used in combination.

The acrylic adhesives are each an adhesive including, as a main component, a polymer formed from one or more (meth)acrylic acid alkyl esters, as a main ingredient, such as ethyl acrylate, butyl acrylate, 2-ethylhexyl acrylate, isooctyl acrylate, and isononyl acrylate and one or more modifying monomers added thereto according to need, such as acrylonitrile, vinyl acetate, styrene, methyl methacrylate, acrylic acid, maleic anhydride, vinylpyrrolidone, glycidyl methacrylate, dimethylaminoethyl methacrylate, hydroxyethyl acrylate, and acrylamide.

The rubber-based adhesives are each an adhesive including, as a main component, a rubbery polymer such as natural rubber, a styrene/isoprene/styrene block copolymer, a styrene/butadiene/styrene block copolymer, a styrene/ethylene-butylene/styrene block copolymer, a styrene/butadiene rubber, polybutadiene, polyisoprene, polyisobutylene, a butyl rubber, a chloroprene rubber, or a silicone rubber.

Various additives can be suitably incorporated into those adhesives. The additives include tackifier resins such as rosins, terpene resins, styrene resins, aliphatic petroleum resins, aromatic petroleum resins, xylene resins, phenolic resins, coumarone-indene resins, and products of hydrogenation of these resins, crosslinking agents, viscosity regulators (thickeners, etc.), leveling agents, releasability regulators, plasticizers, softeners, fillers, colorants (pigments, dyes, etc.), surfactants, antistatic agents, antiseptics, ageing inhibitors, ultraviolet absorbers, antioxidants, and light stabilizers.

The adhesive to be used can be either a solvent-based adhesive or an aqueous dispersion type adhesive. It is preferred to use an aqueous dispersion type adhesive from the standpoint that this adhesive can be applied at a high speed, is friendly to the environment, and is reduced in the possibility that a solvent might exert influences (swelling, dissolution) on the core material.

In the threadlike adhesive body including a core material, the adhesive is preferably adherent in a large amount to the core material, from the standpoint of adhesive force. Specifically, the amount of the adherent adhesive (weight of the adhesive layer per unit length) is preferably 5 mg/m or larger, more preferably 8 mg/m or larger, still more preferably 16 mg/m or larger. Meanwhile, in case where the amount of the adherent adhesive is too large, application of the adhesive to the core material is required to be conducted multiple times or drying the applied adhesive requires a prolonged time period in a production step, resulting in a low production efficiency. Consequently, the amount of the adherent adhesive is preferably 200 mg/m or less, more preferably 180 mg/m or less, still more preferably 160 mg/m or less.

The core material in the threadlike adhesive body including a core material is not particularly limited in the structure, material, etc. thereof so long as the core material is a threadlike member. The structure, material, etc. thereof may be suitably regulated in accordance with required properties such as strength, weight, hardness, etc.

The core material has a cross-sectional shape which is typically circular. However, the cross-sectional shape thereof can be any of various shapes including elliptic and polygonal shapes, besides the circular shape.

The core material may be a monofilament, which is constituted of a single filament, or a multifilament, which is composed of a plurality of filaments, or may be a spun yarn, a finished yarn which has undergone crimping, bulking, etc. and is generally called a textured yarn, bulky yarn, or stretch yarn, a hollow fiber, a yarn obtained by combining two or more of these, for example, by twisting, or the like.

The thickness of the core material is not particularly limited, and may be suitably regulated, together with the thickness of the adhesive layer, so that the threadlike adhesive body has a suitable thickness according to the width of the gap.

A material for constituting the core material may be suitably selected in accordance with required properties such as strength, weight, and hardness.

Examples of usable materials for the core material include: various polymeric materials including rayon, cupra, acetate, promix, nylon, aramid, vinylon, vinylidene, poly(vinyl chloride), polyesters, acrylics, polyolefins such as polyethylene (PE), polypropylene (PP), ethylene/propylene copolymers, and ethylene/vinyl acetate copolymers, polyesters such as poly(ethylene terephthalate), vinyl chloride resins, vinyl acetate resins, polyimide resins, polyamide resins, fluororesins, polyurethanes, polychlal, and poly(lactic acid); various rubbers including natural rubber and synthetic rubbers including polyurethanes; inorganic materials such as glasses, carbon materials, and metals; natural materials such as cotton and wool; and foamed objects such as foamed polyurethanes and foamed polychloroprene rubbers.

Various additives such as, for example, a filler (an inorganic filler, an organic filler, etc.), an aging inhibitor, an antioxidant, an ultraviolet absorber, an antistatic agent, a lubricant, a plasticizer, and a colorant (a pigment, a dye, etc.) may have been incorporated into the core material according to need. The surface of the core material may have undergone a known or common surface treatment such as, for example, a corona discharge treatment, a plasma treatment, or undercoating.

In the threadlike adhesive body including a core material, the entire peripheral surface of the core material need not be always covered with the adhesive layer, and the peripheral surface thereof may include portions not covered with the adhesive layer so long as the effects of the present invention are produced. The end surfaces of the core material may or may not be covered with an adhesive layer. For example, in the case where the adhesive object has been cut during production thereof or is cut when used, the end surfaces of the core material cannot be covered with an adhesive layer.

[Temporary-Support-Supported Threadlike Adhesive Body]

In FIG. 1 is shown a diagrammatic slant view of a temporary-support-supported threadlike adhesive body in this embodiment.

The temporary-support-supported threadlike adhesive body 1 in this embodiment is obtained by applying the threadlike adhesive body 3 to a temporary support 2. The temporary support is not particularly limited in its shape, but is, for example, preferably filmy as shown in FIG. 1.

The shape of the threadlike adhesive body on the temporary support is explained below. In the following explanation, the term "shape of a threadlike adhesive body" means the shape of the threadlike adhesive body applied to a given surface (a surface of a temporary support or adherend) and viewed from the side where the threadlike adhesive body has been applied.

Although the temporary-support-supported threadlike adhesive body according to this embodiment is used for applying the threadlike adhesive body to an adherend so that the applied threadlike adhesive body has a desired shape, this threadlike adhesive body is applied to the adherend by transferring the threadlike adhesive body from the temporary support to the adherend as will be described later. The threadlike adhesive body applied to the adherend hence has a shape which is reverse to the shape of the threadlike adhesive body of the temporary-support-supported threadlike adhesive body. Consequently, in applying the threadlike adhesive body to a temporary support to produce a temporary-support-supported threadlike adhesive body, the threadlike adhesive body is applied to the temporary support so as to have a shape reverse to the desired shape.

In cases when the surface of the temporary support on which the threadlike adhesive body is applied (hereinafter referred to also as "application surface") is low in the property of releasing the threadlike adhesive body, then the threadlike adhesive body can be stably applied to the application surface of the temporary support, making it easy to apply the threadlike adhesive body in a shape reverse to the desired shape.

Examples of indexes to the release properties, regarding the release of the threadlike adhesive body, of the application surface of the temporary support include a peel adhesive force measured by the peel test described below. The higher the peel adhesive force, the lower the release properties.

Hence, the peel adhesive force of the application surface of the temporary support in this embodiment is preferably 0.30 N/50 mm or higher, more preferably 0.50 N/50 mm or higher, still more preferably 1 N/50 mm or higher, especially preferably 2 N/50 mm or higher.

Meanwhile, in case where the temporary support is lower in the property of releasing the threadlike adhesive body than the adherend, it is likely to be difficult to remove the temporary support from the threadlike adhesive body after application of the threadlike adhesive body to the adherend. Hence, the peel adhesive force of the temporary support in this embodiment is preferably lower than the peel adhesive force of the adherend. For example, the peel adhesive force of the application surface of the temporary support in this embodiment is preferably 55 N/50 mm or less, more preferably 45 N/50 mm or less, still more preferably 35 N/50 mm or less.

<Explanation of Peel Test>

In this peel test, an adhesive tape for release-property evaluation is first produced, and this adhesive tape is applied to the temporary support and peeled therefrom to measure the adhesive force (peel adhesive force).

A method for producing the adhesive tape for release-property evaluation and a method for measuring peel adhesive force are explained in detail below.

(Method for producing Adhesive Tape for Release-Property Evaluation)

First, 40 parts by weight of ion-exchanged water is introduced into a reaction vessel equipped with a cooling tube, a nitrogen introduction tube, a thermometer, and a stirrer and is stirred at 60° C. for 1 hour or longer while nitrogen gas is being introduced, thereby performing nitrogen displacement.

Next, 0.1 part by weight of 2,2'-azobis[N-(2-carboxyethyl)-2-methylpropionamidine] n-hydrate (polymerization initiator) is introduced into the reaction vessel.

A monomer emulsion obtained by adding 98 parts by weight of 2-ethylhexyl acrylate, 1.25 parts by weight of acrylic acid, 0.75 parts by weight of methacrylic acid, 0.05 parts by weight of lauryl mercaptan (chain transfer agent), 0.02 parts by weight of γ-methacryloxypropyltrimethoxysilane (trade name "KBM-503, manufactured by Shin-Etsu Chemical Co., Ltd.), and 2 parts by weight of polyoxyethylene sodium lauryl sulfate (emulsifier) to 30 parts by weight of ion-exchanged water and emulsifying the mixture is gradually introduced dropwise into the reaction vessel over 4 hours while the system is kept at 60° C., thereby allowing an emulsion polymerization reaction to proceed.

After completion of the dropwise addition of the monomer emulsion, the system is held at 60° C. for 3 hours and then cooled to room temperature, and 10% by weight ammonia water is subsequently added thereto to adjust the pH of the system to 7, thereby obtaining an acrylic-polymer emulsion (aqueous dispersion type acrylic polymer).

Thereafter, a tackifier-resin emulsion (an aqueous emulsion of a polymerized-rosin ester having a softening point of 160° C.; trade name "E-865NT", manufactured by Arakawa Chemical Industries., Ltd.) is added thereto in an amount of 10 parts by weight on a solid basis per 100 parts by weight of the acrylic polymer contained in the obtained aqueous dispersion type acrylic polymer. Using 10% by weight ammonia water as a pH regulator and poly(acrylic acid) (trade name "Aron B-500", manufactured by Toagosei Co., Ltd.) as a thickener, the resultant mixture is regulated so as to have a pH of 7.2 and a viscosity of 10 Pas, thereby obtaining an aqueous dispersion type acrylic adhesive composition.

Thereafter, the obtained aqueous dispersion type acrylic adhesive composition is applied to a PET substrate having dimensions of 700 mm×250 mm and a thickness of 25 μm (trade name "Lumirror S10", manufactured by Toray Industries, Inc.) with an applicator and dried at 100° C. for 2 minutes to form an adhesive layer having a thickness of 40 μm, thereby obtaining an adhesive tape for release-property evaluation.

(Peel Test)

The surface of the temporary support which is evaluated for release property is bonded to an SUS plate using a double-faced adhesive tape (trade name "VR-5300", manufactured by Nitto Denko Corp.). Thereafter, the adhesive tape for release-property evaluation is cut into a size having a width of 50 mm and a length of 100 mm and is applied and press-bonded, by rolling a 2-kg roller forward and backward once, to the surface of the temporary support which is evaluated for release property. At 20 minutes after the press bonding, the adhesive tape for release-property evaluation is peeled from the temporary support under the conditions of a peel angle of 180° and a peel rate of 300 mm/min to measure the adhesive force (peel adhesive force).

The release properties of the temporary support can be regulated, for example, by a method in which the material of the temporary support is suitably changed or a roughening treatment or a releasant treatment is given to the surface of the temporary support.

Examples of methods for the roughening treatment include embossing and blasting. Use may also be made of a method in which a composition including a binder resin and particles is applied to the temporary support and then cured to thereby form a rugged surface on the temporary support. Other known methods may be used, such as, for example, screen printing, gravure printing, or transfer by nanoimprinting. Especially preferred of these is embossing, because desired release properties are easy to obtain therewith.

The releasant treatment can be conducted by applying a release agent to the temporary support. As the release agent, any desired appropriate release agent can be employed. For example, use can be made of silicone release agents, fluorochemical release agents, long-chain-alkyl release agents, low-molecular-weight polyethylene release agents, low-molecular-weight polypropylene release agents, rubber-based polymers, phosphoric ester type surfactants, and the like.

The hardness of the temporary support is not particularly limited, and may be suitably set in accordance with uses, the shape of the threadlike adhesive body, etc.

For example, in the case where the adherend has surface irregularities, a flexible temporary support is preferred because this temporary support can be deformed along the irregularities. Meanwhile, in the case where the temporary support is required to have strength, the temporary support preferably is hard.

The temporary support has a 5%-strain stress of preferably 20 N or higher, more preferably 25 N or higher, still more preferably 30 N or higher. It is thought that in cases when a temporary support having a 5%-strain stress of 20 N or higher is to be removed by peeling, this temporary support can be removed while the threadlike adhesive body is being pressed against the adherend by the rigidity (repellent force) of the temporary support and the threadlike adhesive body can hence be easily transferred to the adherend. The 5%-strain stress of the temporary support can be measured by the method described in the Examples.

The temporary support is preferably one which has been embossed. It is thought that in cases when a temporary support which has been embossed is used, the threadlike adhesive body adheres to the temporary support in a reduced area and hence can be easily transferred to an adherend even when the temporary support is flexible.

In cases when the adherend is flexible and easy to deform, a preferred peel angle which will be described later can be attained by deforming the adherend without deforming the temporary support.

The thickness of the temporary support also is not particularly limited, and may be suitably regulated in accordance with desired hardness, etc.

The material of the temporary support in this embodiment is not particularly limited, and may be suitably selected in accordance with desired release properties, hardness, etc.

For example, a sheet of paper, resin film, metal foil, or the like which has undergone a surface treatment such as a roughening treatment or a releasant treatment according to need can be used as the temporary support.

As a resin for constituting the resin film, use can be made, for example, of a polyester resin, a polyolefin resin, a polyamide resin, a polyimide resin, a poly(phenylene sulfide) resin, a polycarbonate resin, a polyurethane resin, an ethylene/vinyl acetate resin, a fluororesin, e.g., polytetrafluoroethylene, an acrylic resin, e.g., poly(methyl methacrylate), or the like. The resin film may be one formed from a resinous material including a single resin selected from among such resins or may be one formed from a resinous material including a blend of two or more of those resins. The resin film may be an unstretched one or may be a resin film which has been stretched (uniaxially or biaxially).

By heating the temporary support at, for example, 40-80° C., preferably 50-70° C., improved drawing properties can be attained in producing a temporary-support-supported threadlike adhesive body.

This is thought to be because the heating brings about changes in the distribution of components in the surface of the temporary support and in modulus and results in enhanced tackiness.

The improved drawing properties make it possible to lower the pressure for press-bonding the threadlike adhesive body. In cases when a lowered pressure is used, the temporary support can be prevented from coming to have rumples or wrinkles even when thin or flexible.

The temporary-support-supported threadlike adhesive body according to this embodiment may further include a release liner disposed on the side where the threadlike adhesive body lies. That is, in the temporary-support-supported threadlike adhesive body according to this embodiment, the threadlike adhesive body may be sandwiched between the temporary support and the release liner.

The release liner is disposed in order to protect the surface of the threadlike adhesive body which is to be applied to an adherend.

The material, thickness, hardness, etc. of the release liner are not particularly limited. However, since it is necessary, in preparation for applying the threadlike adhesive body to an adherend, to first remove only the release liner from the threadlike adhesive body sandwiched between the temporary support and the release liner, the release liner is preferably higher in the property of releasing the threadlike adhesive body than the temporary support. That is, the release liner is preferably lower in the peel adhesive force described above than the temporary support.

The back surface of the temporary support may be used as a release liner. That is, to that surface of the threadlike adhesive body which is to be applied to an adherend, the temporary support of another temporary-support-supported threadlike adhesive body may have been applied. Examples of methods for obtaining such state include a method (method A) in which a plurality of temporary-support-supported threadlike adhesive bodies are superposed and a method (method B) in which a sheet obtained by applying a plurality of threadlike adhesive bodies to one temporary support is rolled up.

In the case of using method B, it is preferred either to employ a temporary support having a compressive modulus of 1.5 MPa or less or to further provide a release liner to the side where the threadlike adhesive body lies, as stated above, the release liner having a compressive modulus of 1.5 MPa or less. By employing the temporary support or release liner having a compressive modulus of 1.5 MPa or less, the winding pressure imposed on the adhesive tape during roll production can be lessened. In addition, roll tightening which occurs as a result of roll stacking and due to temperature/humidity fluctuations during the storage and transportation of the rolls can be lessened.

Compressive modulus can be determined, for example, by the following compression test in which an Autograph (small bench tester EXtest, manufactured by Shimadzu Corp.) is used.

In a room having a temperature of 23° C., a specimen (4 cm (length)×4 cm (width)) is placed on an acrylic table, and a cylindrical indenter (made of SUS; indenting area, 100 mm$^2$) is pressed against the center of the specimen in a direction perpendicular thereto at a compression rate of 0.1 mm/min to measure the compressive stress, from which the compressive modulus E (MPa) is calculated using the following equation.

$$E \text{ (MPa)} = (\sigma 2 - \sigma 1)/(\varepsilon 2 - \varepsilon 1)$$

Compressive stress σ1: 0.005 (MPa)
Compressive stress σ2: 0.01 (MPa)
Compressive strain ε1: compressive strain at compressive stress σ1
Compressive strain ε2: compressive strain at compressive stress σ2

In the case of using method B, the release liner more preferably has a compressive modulus of 1.5 MPa or less. In cases when the release liner is used, the threadlike adhesive body is not exposed when the temporary-support-supported threadlike adhesive body according to this embodiment is used. In addition, use of the release liner is effective in avoiding a trouble in which the temporary support becomes soft to render drawing with a nozzle pressed thereagainst difficult.

In the case of using a release liner, there preferably is a difference between the peel adhesive force of the temporary support and the peel adhesive force of the release liner. The difference in peel adhesive force [(peel adhesive force of temporary support)−(peel adhesive force of release liner)] is preferably 0.5 N/50 mm or larger, more preferably 5 N/50 mm or larger, still more preferably 10 N/50 mm or larger.

[Method for Applying the Threadlike Adhesive Body]

Figure 2:
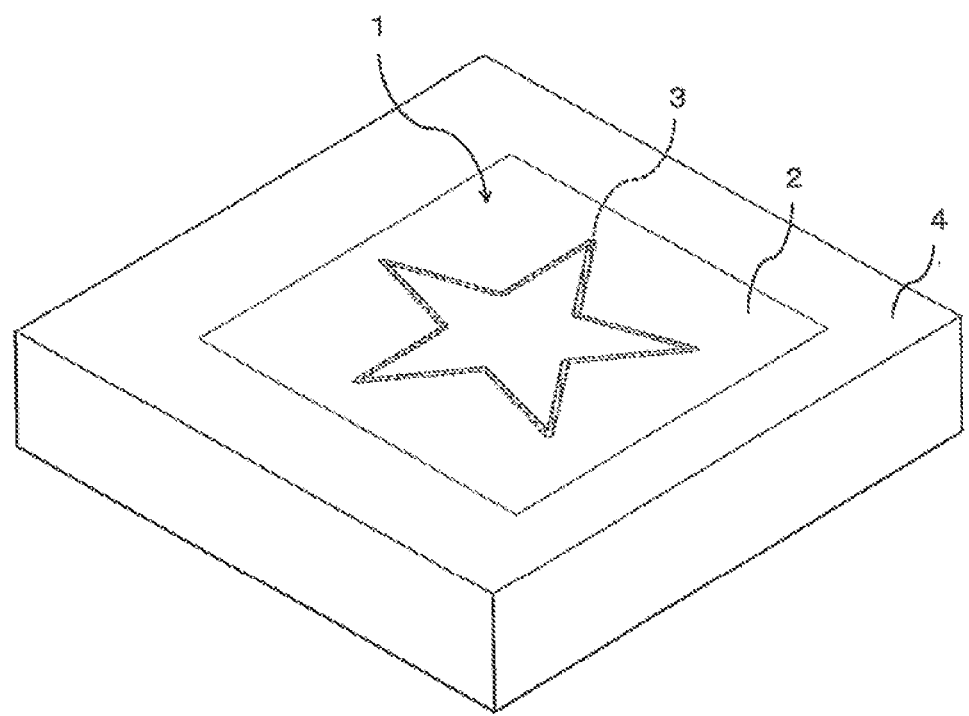
FIG. 2 is a diagrammatic slant view of the temporary-support-supported threadlike adhesive body shown in FIG. 1 in which a surface where the threadlike adhesive body lies has been press-bonded to an adherend.

In FIG. 2 is shown a diagrammatic slant view of the temporary-support-supported threadlike adhesive body 1 in which the surface where the threadlike adhesive body 3 lies has been press-bonded to an adherend 4. In the method of this embodiment for applying a threadlike adhesive body, the temporary-support-supported threadlike adhesive body 1 is press-bonded in that manner, thereby applying (transferring) the threadlike adhesive body 3 to the adherend 4 so that the applied threadlike adhesive body 3 has a desired shape.

Methods for the press bonding are not particularly limited so long as the threadlike adhesive body is bonded to an adherend. For example, pressing with a roller or a finger through the temporary support may suffice.

Figure 3:
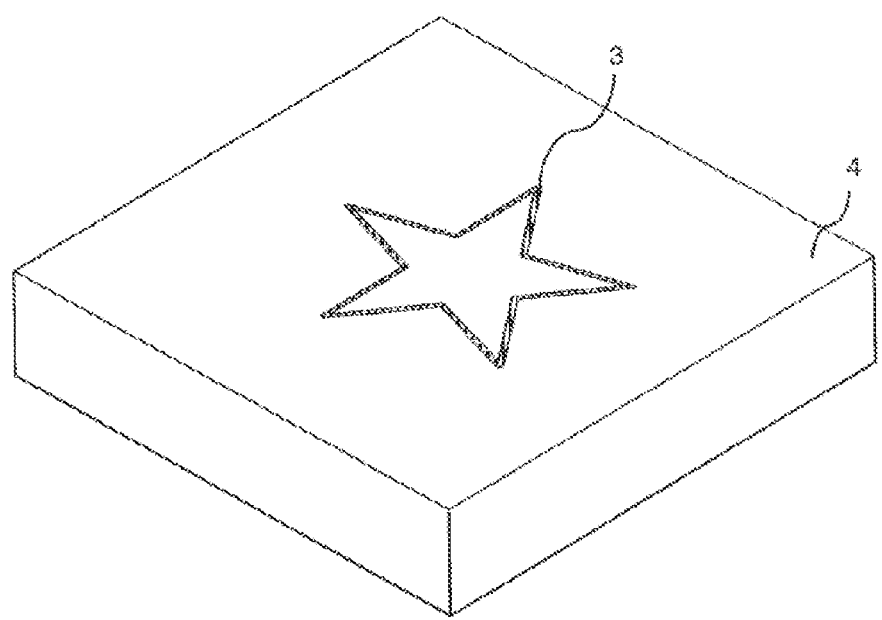
FIG. 3 is a diagrammatic slant view showing a state of the threadlike adhesive body shown in FIG. 2 from which the temporary support has been removed.

Thereafter, the temporary support 2 is removed from the threadlike adhesive body 3 to expose the threadlike adhesive body 3. In FIG. 3 is shown a diagrammatic slant view showing a state of the threadlike adhesive body 3 from which the temporary support 2 has been removed. By applying an article to the threadlike adhesive body 3 which has been thus exposed, the article can be bonded to the adherend 4.

From the standpoint of transferring the threadlike adhesive body without fail, that is, from the standpoint of preventing some of the threadlike adhesive body from being separated from the adherend and remaining on the temporary support, it is preferred to remove the temporary support from the adherend by peeling. This peeling is conducted at a peel angle of preferably 5° or larger, more preferably 10° or larger, still more preferably 20° or larger. In the removal by peeling, the temporary support may be removed while being deformed or while the adherend is being deformed, or may be removed while both the temporary support and the adherend are being deformed. An appropriate removal method may be suitably selected in accordance with the hardness (deformability) of the temporary support and adherend.

As described above, in the method of this embodiment for applying a threadlike adhesive body, the threadlike adhesive body having a shape reverse to a desired shape is formed (drawn) on a temporary support and then transferred, thereby applying the threadlike adhesive body to an adherend so that the applied threadlike adhesive body has the desired shape. This method enables the application of a threadlike adhesive body to an adherend to be easily conducted even when the portion where the threadlike adhesive body is to be applied has a complicated shape.

Due to these features, the method of this embodiment for applying a threadlike adhesive body is suitable for use as a method for applying a threadlike adhesive body, for example, for fixing various wire materials (linear members), such as cables, e.g., electrical wires and optical fibers, LED fiber lights, optical fiber sensors such as FBGs (Fiber Bragg Gratings), threads, cords, and wires, or narrow members so as to result in desired configurations. Also in cases when a wire material or a narrow member is to be fixed to another member so that the fixed material or member has a complicated shape, the method of this embodiment for applying a threadlike adhesive body enables the threadlike adhesive body to be easily applied to the member to which the wire material or narrow member is to be bonded, in accordance with a complicated shape to be possessed by the wire material or narrow member.

Furthermore, the method of this embodiment for applying a threadlike adhesive body is suitable also for use as a method for applying a threadlike adhesive body, for example, for temporary fixing (temporary tacking) one article to a surface of another article. For example, this method is suitable for use as a method for applying a threadlike adhesive body for temporary fixing (temporary tacking) in producing textile products, leather products, and the like, such as garments, shoes, bags, hats, and caps. For example, in cases when a threadlike adhesive body is used for temporary fixing in producing a textile product or a leather product by sewing, then the temporary fixing can be easily conducted so that portions to be sewn are not involved in the temporary fixing, and the adhesive can be easily prevented from adhering to the needle. However, in cases when the article to be produced by sewing has a complicated shape or is apt to be deformed, the application of a threadlike adhesive body is sometimes not easy. Even in such cases, by the method of this embodiment for applying a threadlike adhesive body, the threadlike adhesive body can be easily applied.

The uses which have been explained above are mere examples, and uses to which the method of this embodiment for applying a threadlike adhesive body is applicable are not limited to those.

While embodiments of the present invention have been explained above with reference to the drawings, the present invention is not limited to the embodiments and can be suitably modified within the technical range of the present invention.

EXAMPLES

The present invention is explained below in more detail using Examples, but the present invention is not limited by the following Examples.
<Production of Threadlike Adhesive Body>
(Production of Aqueous Dispersion Type Acrylic Adhesive for Forming Adhesive Layer)

Forty parts by weight of ion-exchanged water was introduced into a reaction vessel equipped with a cooling tube, a nitrogen introduction tube, a thermometer, and a stirrer and was stirred at 60° C. for 1 hour or longer while nitrogen gas was being introduced, thereby performing nitrogen displacement. Into this reaction vessel was introduced 0.1 part by weight of 2,2'-azobis[N-(2-carboxyethyl)-2-methylpropionamidine] n-hydrate (polymerization initiator). A monomer emulsion was gradually introduced dropwise into the reaction vessel over 4 hours while the system was kept at 60° C., thereby allowing an emulsion polymerization reaction to proceed. The monomer emulsion was one obtained by adding 98 parts by weight of 2-ethylhexyl acrylate, 1.25 parts by weight of acrylic acid, 0.75 parts by weight of methacrylic acid, 0.05 parts by weight of lauryl mercaptan (chain transfer agent), 0.02 parts by weight of γ-methacryloxypropyltrimethoxysilane (trade name "KBM-503, manufactured by Shin-Etsu Chemical Co., Ltd.), and 2 parts by weight of polyoxyethylene sodium lauryl sulfate (emulsifier) to 30 parts by weight of ion-exchanged water and emulsifying the mixture. After completion of the dropwise addition of the monomer emulsion, the system was held at 60° C. for further 3 hours and then cooled to room temperature, and 10% by weight ammonia water was subsequently added thereto to adjust the pH of the system to 7, thereby obtaining an acrylic-polymer emulsion (aqueous dispersion type acrylic polymer).

A tackifier-resin emulsion (trade name "E-865NT", manufactured by Arakawa Chemical Industries., Ltd.) was added thereto in an amount of 20 parts by weight on a solid basis per 100 parts by weight of the acrylic polymer contained in the acrylic-polymer emulsion. Using 10% by mass ammonia water as a pH regulator and poly(acrylic acid) (trade name "Aron B-500", manufactured by Toagosei Co., Ltd.) as a thickener, the resultant mixture was regulated so as to have a pH of 7.2 and a viscosity of 10 Pa·s. Thus, an aqueous dispersion type acrylic adhesive for adhesive layer formation was obtained.
(Production of Core Material)

Forty-eight polyester filaments were twisted to form 150 twists per m, thereby obtaining a core material (fineness, 280 dtex).

(Production of Threadlike Adhesive Body)

The obtained aqueous dispersion type acrylic adhesive was applied to the obtained core material by dipping so as to give a threadlike adhesive body in which the amount of the adherent adhesive was 22 mg/m. Thereafter, the applied adhesive was dried at 80° C. for 5 minutes to form an adhesive layer, thereby obtaining a threadlike adhesive body.
<Preparation of Temporary Supports>

The temporary supports shown below were prepared.

Temporary support 1: A PET film treated with silicone releasant (trade name "Diafoil MRF", manufactured by Mitsubishi Chemical Corp.)

Temporary support 2: A silicone release liner (product No. "E7006", manufactured by Toyobo Co., Ltd.)

Temporary support 3: A silicone release liner (product No. "E7001", manufactured by Toyobo Co., Ltd.)

Temporary support 4: A non-silicone release liner (product No. "TN100", manufactured by Toyobo Co., Ltd.)

Temporary support 5: A high-density polyethylene film (manufactured by Sankyo Polyethylene Co., Ltd.)

Temporary support 6a: A non-silicone release liner (product No. "TN200, manufactured by Toyobo Co., Ltd.)

Temporary support 6b: A non-silicone release liner (product No. "TN200, manufactured by Toyobo Co., Ltd.)

Temporary support 7: An embossed polyurethane film (trade name "ESMER PX-II", manufactured by Nihon Matai Co., Ltd.)

Temporary support 8: A polyethylene film (manufactured by Okura Industrial Co., Ltd.)

Temporary support 9: Trade name "Torayfan BO YT42", manufactured by Toray Industries, Inc.)

Temporary support 10: An embossed sheet of polyethylene (satin; manufactured by Okura Industrial Co., Ltd.)

Temporary support 11: A PET film (trade name "Lumirror S10", manufactured by Toray Industries, Inc.)

Incidentally, temporary support 1 is in common use as the release liners of double-faced adhesive tapes and the like.

Those temporary supports had thicknesses shown in Tables 1 to 3, which will be given later.

Test Example 1

<Evaluation of Release Properties of Temporary Supports>
An adhesive tape for release-property evaluation was produced in the manner shown below. This adhesive tape was applied to the temporary support of each Example and peeled therefrom to measure the adhesive force (peel adhesive force).

The method for producing the adhesive tape for release-property evaluation and a method for measuring the peel adhesive force are explained in detail below.
(Production of Adhesive Tape for Release-Property Evaluation)

First, 40 parts by weight of ion-exchanged water was introduced into a reaction vessel equipped with a cooling tube, a nitrogen introduction tube, a thermometer, and a stirrer and was stirred at 60° C. for 1 hour or longer while nitrogen gas was being introduced, thereby performing nitrogen displacement.

Next, 0.1 part by weight of 2,2'-azobis[N-(2-carboxyethyl)-2-methylpropionamidine] n-hydrate (polymerization initiator) was introduced into the reaction vessel.

A monomer emulsion obtained by adding 98 parts by weight of 2-ethylhexyl acrylate, 1.25 parts by weight of acrylic acid, 0.75 parts by weight of methacrylic acid, 0.05 parts by weight of lauryl mercaptan (chain transfer agent), 0.02 parts by weight of γ-methacryloxypropyltrimethoxysilane (trade name "KBM-503, manufactured by Shin-Etsu Chemical Co., Ltd.), and 2 parts by weight of polyoxyethylene sodium lauryl sulfate (emulsifier) to 30 parts by weight of ion-exchanged water and emulsifying the mixture was gradually introduced dropwise into the reaction vessel over 4 hours while the system was kept at 60° C., thereby allowing an emulsion polymerization reaction to proceed.

After completion of the dropwise addition of the monomer emulsion, the system was held at 60° C. for 3 hours and then cooled to room temperature, and 10% by weight ammonia water was subsequently added thereto to adjust the pH of the system to 7, thereby obtaining an acrylic-polymer emulsion (aqueous dispersion type acrylic polymer).

Thereafter, a tackifier-resin emulsion (an aqueous emulsion of a polymerized-rosin ester having a softening point of 160° C.; trade name "E-865NT", manufactured by Arakawa Chemical Industries., Ltd.) was added thereto in an amount of 10 parts by weight on a solid basis per 100 parts by weight of the acrylic polymer contained in the obtained aqueous dispersion type acrylic polymer. Using 10% by weight ammonia water as a pH regulator and poly(acrylic acid) (trade name "Aron B-500", manufactured by Toagosei Co., Ltd.) as a thickener, the resultant mixture was regulated so as to have a pH of 7.2 and a viscosity of 10 Pas, thereby obtaining an aqueous dispersion type acrylic adhesive composition.

Thereafter, the obtained aqueous dispersion type acrylic adhesive composition was applied to a PET substrate having dimensions of 700 mm×250 mm and a thickness of 25 μm (trade name "Lumirror S10", manufactured by Toray Industries, Inc.) with an applicator and dried at 100° C. for 2 minutes to form an adhesive layer having a thickness of 40 μm, thereby obtaining an adhesive tape for release-property evaluation.
(Peel Test)

The reverse side of the surface of the temporary support which was to be evaluated for release property was bonded to an SUS plate using a double-faced adhesive tape (trade name "VR-5300", manufactured by Nitto Denko Corp.). Thereafter, the adhesive tape for release-property evaluation was cut into a size having a width of 50 mm and a length of 100 mm and was applied and press-bonded, by rolling a 2-kg roller forward and backward once, to the surface of the temporary support which was to be evaluated for release property. At 20 minutes after the press bonding, the adhesive tape for release-property evaluation was peeled from the temporary support under the conditions of a peel angle of 180° and a peel rate of 300 mm/min to measure the adhesive force (peel adhesive force). The results of the measurement are shown in Table 1.
<Production of Temporary-Support-Supported Threadlike Adhesive Bodies and Evaluation of Drawing Properties>

It was attempted to apply the threadlike adhesive body produced in the manner shown above to that surface of each temporary support which had been examined for peel adhesive force, by lightly pressing it against the surface with a hand or a rod so that the applied threadlike adhesive body had the shape of an equilateral triangle in which each side had a length of 60 mm. The temporary supports were evaluated on the basis of the following criteria. The results thereof are shown in Table 1.

1. The threadlike adhesive body was unable to be applied so as to have the equilateral-triangle shape, even when a higher load was used or the thickness of the threadlike adhesive body was increased.

2. The threadlike adhesive body was able to be applied so as to have the equilateral-triangle shape by applying a higher load or increasing the thickness of the threadlike adhesive body.

3. The threadlike adhesive body was able to be applied so as to have the equilateral-triangle shape.

4. The threadlike adhesive body was able to be applied so as to have the equilateral-triangle shape, and even when the temporary support was bent, the threadlike adhesive body remained tightly adherent and was resistant to the movements.
<Evaluation of Transferability of Threadlike Adhesive Body>

Each temporary-support-supported threadlike adhesive body obtained in the evaluation of drawing properties was placed on an acrylic plate so that the threadlike adhesive body faced downward. The threadlike adhesive body was press-bonded thereto by rolling a 2-kg roller forward and backward once through the temporary support. Thereafter, the temporary support was peeled off under the conditions of a peel angle of about 90° and a peel rate of about 50 mm/min. The transferability of the threadlike adhesive body of the temporary-support-supported threadlike adhesive body was evaluated by examining the state of the resultant threadlike adhesive body, on the basis of the following criteria. The results thereof are shown in Table 1.

The temporary-support-supported threadlike adhesive body 1 obtained using temporary support 1 was not subjected to the evaluation of transferability.

1. The threadlike adhesive body was unable to be transferred to the acrylic plate.

2. The threadlike adhesive body was able to be transferred to the acrylic plate, but lifting had occurred and the equilateral-triangle shape had deformed.

3. The threadlike adhesive body was able to be transferred to the acrylic plate, but lifting had occurred and the threadlike adhesive body had portions where the acrylic-plate-side surface thereof was not adherent to the acrylic plate.

4. The threadlike adhesive body was able to be transferred to the acrylic plate, and the acrylic-plate-side surface of the threadlike adhesive body was wholly adherent to the acrylic plate.

5. The threadlike adhesive body was able to be transferred to the acrylic plate without pressing, and the acrylic-plate-side surface of the threadlike adhesive body was wholly adherent to the acrylic plate.
<Measurement of 5%-Strain Stress>

Each temporary support was cut into a size having a width of 10 mm and a length of 50 mm, set on an Autograph (small bench tester EXtest, manufactured by Shimadzu Corp.) at a chuck-to-chuck distance of 10 mm, and stretched at 200 mm/min to measure a stress at a strain of 5%. The results thereof are shown in Table 1.

TABLE 1

| | Temporary support | | Peel adhesive force [N/50 mm] | drawing property | Transferability | 5%-strain stress [N] |
|---|---|---|---|---|---|---|
| | No. | Thickness [μm] | | | | |
| Example 1-1 | 1 | 38 | 0.25 | 2 | — | 37.3 |
| Example 1-2 | 2 | 50 | 3.3 | 3 | 5 | 49.0 |
| Example 1-3 | 3 | 25 | 5.9 | 3 | 5 | 24.7 |
| Example 1-4 | 4 | 50 | 5.9 | 3 | 5 | 47.4 |
| Example 1-5 | 5 | 30 | 10.6 | 3 | 3 | 5.8 |

TABLE 1-continued

| | | Temporary support | Peel adhesive | | | |
|---|---|---|---|---|---|---|
| | No. | Thickness [μm] | force [N/50 mm] | drawing property | Transferability | 5%-strain stress [N] |
| Example 1-6 | 6a | 50 | 10.6 | 3 | 5 | 43.9 |
| Example 1-7 | 7 | 320 | 13.8 | 4 | 4 | 2.0 |
| Example 1-8 | 8 | 150 | 15.3 | 4 | 4 | 16.7 |
| Example 1-9 | 9 | 40 | 21.3 | 4 | 3 | 38.7 |
| Example 1-10 | 10 | 100 | 27.6 | 4 | 4 | 2.8 |
| Example 1-11 | 11 | 50 | 31.0 | 4 | 2 | 45.1 |

The threadlike adhesive body was able to be applied, in the shape of an equilateral triangle, to temporary supports 1 to 11 to obtain temporary-support-supported threadlike adhesive bodies 1 to 11. By using each of these temporary-support-supported threadlike adhesive bodies for transferring the threadlike adhesive body to an adherend, the threadlike adhesive body can be applied to the adherend so as to have the shape of an equilateral triangle.

Temporary-support-supported threadlike adhesive bodies 2 to 11 were actually evaluated for transferability and, as a result, the threadlike adhesive body of each of these was able to be transferred to the adherend (acrylic plate). Of these, temporary-support-supported threadlike adhesive bodies 2 to 4 and 6 showed highly excellent transferability.

Examples 1-5 and 1-6 show that use of a temporary support having a higher 5%-strain stress brought about better transferability than using a temporary support having the same peel adhesive force.

Examples 1-9 and 1-10 show that use of an embossed temporary support brought about better transferability than using a temporary support having substantially the same peel adhesive force.

Test Example 2

<Production of Temporary-Support-Supported Threadlike Adhesive Bodies and Evaluation of Drawing Properties>

It was attempted to apply the threadlike adhesive body so that the applied threadlike adhesive body had the shape of an equilateral triangle in which each side had a length of 60 mm, in the same manner as in Test Example 1 except that the threadlike adhesive body was not pressed with a hand or a rod. The temporary supports were evaluated on the basis of the following criteria. The results thereof are shown in Table 2.

1. The threadlike adhesive body was unable to be applied so as to have the equilateral-triangle shape.
2. The threadlike adhesive body was able to be applied only in the linear portions of the triangle shape.
3. The threadlike adhesive body was able to be applied so as to have the equilateral-triangle shape (including the corners).
4. The threadlike adhesive body was able to be applied so as to have the equilateral-triangle shape, and even when the temporary support was bent, the threadlike adhesive body remained tightly adherent and was resistant to the movements.

Furthermore, each of the temporary supports was placed on a hot plate heated to 60° C. and was then subjected to the evaluation of drawing properties. The results thereof are shown in Table 2.

<Evaluation of Transferability of Threadlike Adhesive Body>

The temporary-support-supported threadlike adhesive bodies were evaluated for transferability in the same manner as in Test Example 1. The results thereof are shown in Table 2.

TABLE 2

| | Temporary support | | Drawing property, without pressing | | Transferability |
|---|---|---|---|---|---|
| | No. | Thickness [μm] | Room temperature | 60° C. | (room temperature) |
| Example 2-1 | 1 | 38 | 1 | 1 | — |
| Example 2-2 | 2 | 50 | 1 | 1 | — |
| Example 2-3 | 3 | 25 | 1 | 1 | — |
| Example 2-4 | 4 | 50 | 1 | 3 | 4 |
| Example 2-5 | 6b | 38 | 1 | 3-4 | 4 |
| Example 2-6 | 5 | 30 | 1 | 1 | — |
| Example 2-7 | 9 | 40 | 1 | 3-4 | 4 |
| Example 2-8 | 10 | 100 | 1 | 1 | — |

Examples 2-4, 2-5, and 2-7 show that the temporary supports, when heated, had improved drawing properties.

Test Example 3

<Production of Temporary-Support-Supported Threadlike Adhesive Body and Evaluation of Drawing Properties>

A temporary support was evaluated in the same manner as in Test Example 1, except that the threadlike adhesive body was pressed so that the thickness thereof was halved. The results thereof are shown in Table 3.

<Evaluation of Transferability of Threadlike Adhesive Body>

Figure 4:
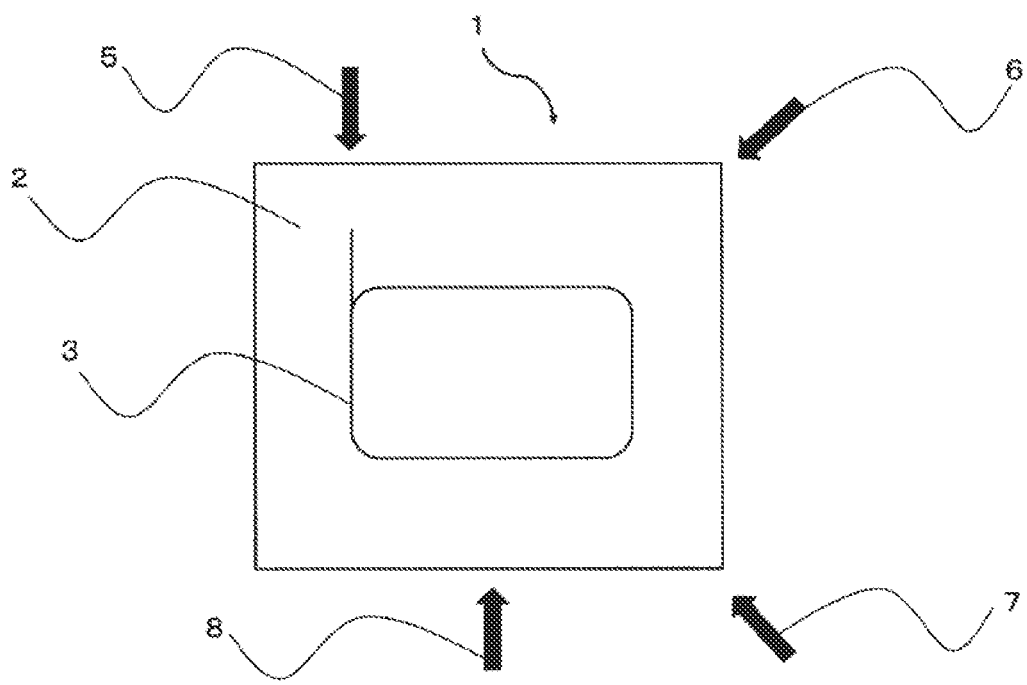
FIG. 4 is a diagrammatic view of a temporary-support-supported threadlike adhesive body used in Test Example 3.

A threadlike adhesive body 3 produced in the same manner as in Test Example 1 was applied, while being pressed so that the thickness thereof was halved, to a temporary support 2 so that the applied threadlike adhesive body 3 had a rectangular shape such as that shown in FIG. 4, thereby obtaining a temporary-support-supported threadlike adhesive body 1. The temporary-support-supported threadlike adhesive body 1 thus obtained was placed on an acrylic plate so that the threadlike adhesive body 3 faced downward. The threadlike adhesive body 3 was press-bonded thereto by rolling a 2-kg roller forward and backward once through the temporary support 2. Thereafter, the temporary support 2 was peeled off, from each of directions 6 to 8 shown in FIG. 4 (corner directions and side direction), under the conditions of a peel angle of about 90° and a peel rate of about 50 mm/min. The transferability was evaluated on the basis of the same criteria as in Test Example 1. The results thereof are shown in Table 3.

Furthermore, transferability was evaluated in the same manner as described above, except that the temporary support was peeled off from direction 5 shown in FIG. 4 (start-point or end-point direction). The results thereof are shown in Table 3.

TABLE 3

| | Temporary support | | Drawing property, with intense pressing (room temperature) | Transferability | |
|---|---|---|---|---|---|
| | No. | Thickness [μm] | | Peeling from corner directions and side direction | Peeling from start-point or end-point direction |
| Example 3-1 | 6a | 50 | 4 | 1-2 | 4 |

Example 3-1 shows that peeling from the start-point or end-point direction resulted in improved transferability.

It is thought that in cases when the temporary support was peeled off from directions 6 to 8 shown in FIG. 4 (corner directions and side direction), the threadlike adhesive body during the transfer was in the state of being only slightly pressed against the acrylic plate. It is thought that the acrylic-plate-side lateral surfaces of the threadlike adhesive body had a round shape and stress was concentrated at the lateral-surface portion to render the threadlike adhesive body prone to separate from the acrylic plate.

Meanwhile, it is thought that in cases when the temporary support was peeled from direction 5 shown in FIG. 4 (start-point or end-point direction), those lateral surfaces were not round and, in addition, the temporary support was able to be peeled off while pressing the threadlike adhesive body against the adherend, resulting in improved transferability.

While the invention has been described in detail and with reference to specific embodiments thereof, it will be apparent to one skilled in the art that various changes and modifications can be made therein without departing from the spirit and scope thereof.

REFERENCE SIGNS LIST

1 Temporary-support-supported threadlike adhesive body
2 Temporary support
3 Threadlike adhesive body
4 Adherend
5, 6, 7, 8 Peeling direction

The invention claimed is:

1. A method for applying a threadlike adhesive body to an adherend, the method comprising:
heating a temporary support to a temperature in a range of 40-80° C.;
applying the threadlike adhesive body to the temporary support in a shape reverse to a desired shape when the temporary support is heated to the temperature in the range of 40-80° C.; and
press-bonding the threadlike adhesive body applied to the temporary support to the adherend to apply the threadlike adhesive body to the adherend,
wherein a surface of the temporary support facing the threadlike adhesive body and to which the threadlike adhesive body is applied is embossed.

2. The method for applying a threadlike adhesive body according to claim 1, which further includes removing the temporary support from the threadlike adhesive body after the press bonding.

3. The method for applying a threadlike adhesive body according to claim 2, wherein the temporary support is removed from the threadlike adhesive body by peeling.

4. The method for applying a threadlike adhesive body according to claim 1, wherein the threadlike adhesive body comprises a threadlike core material and an adhesive layer covering a peripheral surface of the core material.

5. The method for applying a threadlike adhesive body according to claim 1, wherein the temporary support has a 5%-strain stress of 20 N or higher.

6. The method for applying a threadlike adhesive body according to claim 1, wherein the surface of the temporary support to which the threadlike adhesive body is applied has a peel adhesive force measured by a peel test of 0.30 N/50 mm or higher, the peel test comprising:
introducing 40 parts by weight of ion-exchanged water into a reaction vessel equipped with a cooling tube, a nitrogen introduction tube, a thermometer, and a stirrer and stirring for at least 1 hour at 60° C. while nitrogen gas is being introduced;
introducing 0.1 part by weight of 2,2'-azobis [N-(2-carboxyethyl)-2-methylpropionamidine] n-hydrate into the reaction vessel;
obtaining a monomer emulsion obtained by adding 98 parts by weight of 2-ethylhexyl acrylate, 1.25 parts by weight of acrylic acid, 0.75 parts by weight of methacrylic acid, 0.05 parts by weight of lauryl mercaptan, 0.02 parts by weight of γ-methacryloxypropyltrimethoxysilane, and 2 parts by weight of polyoxyethylene sodium lauryl sulfate to 30 parts by weight of ion-exchanged water to form a mixture and emulsifying the mixture, dropwise, into the reaction vessel over 4 hours while the reaction vessel is kept at 60° C.;
holding the reaction vessel at 60° C. for 3 hours and then cooling the reaction vessel to room temperature;
adding 10% by weight ammonia water to the reaction vessel to adjust the pH of the contents of the reaction vessel to obtain an acrylic-polymer emulsion that is an aqueous dispersion type acrylic polymer;
adding a tackifier-resin emulsion that is an aqueous emulsion of a polymerized-rosin ester having a softening point of 160° C. to the reaction vessel in an amount of 10 parts by weight on a solid basis per 100 parts by weight of the acrylic polymer contained in the obtained aqueous dispersion type acrylic polymer;
regulating the contents in the reaction vessel to have a pH of 7.2 and a viscosity of 10 Pa·s by using 10% by weight ammonia water as a pH regulator and poly (acrylic acid) as a thickener to obtain an aqueous dispersion type acrylic adhesive composition;
applying the obtained aqueous dispersion type acrylic adhesive composition to a polyethylene terephthalate (PET) substrate having dimensions of 700 mm×250 mm and a thickness of 25 μm with an applicator and drying the applied aqueous dispersion type acrylic adhesive composition at 100° C. for 2 minutes to form an adhesive layer having a thickness of 40 μm to obtain an adhesive tape for release-property evaluation;
bonding a reverse-side surface of the temporary support opposite to the surface facing the threadlike adhesive body to a stainless steel plate using a double-faced adhesive tape;

cutting the adhesive tape for release-property evaluation into a size having a width of 50 mm and a length of 100 mm;

applying and press-bonding the cut adhesive tape for release-property evaluation by rolling a 2-kg roller forward and backward once, to the surface of the temporary support to which the threadlike adhesive body is applied;

after sitting for 20 minutes subsequent to press-bonding the cut adhesive tape for release-property evaluation to the surface of the temporary support to which the threadlike adhesive body is applied, the cut adhesive tape for release-property evaluation is peeled from the temporary support under the conditions of a peel angle of 180° and a peel rate of 300 mm/min to measure the peel adhesive force.

7. The method for applying a threadlike adhesive body according to claim 6, wherein the surface of the temporary support to which the threadlike adhesive body is applied is lower in peel adhesive force measured by the peel test than a surface of the adherend to which the threadlike adhesive body is applied.

8. The method for applying a threadlike adhesive body according to claim 1, further comprising:
applying a release liner on the threadlike adhesive body with the threadlike adhesive body sandwiched between the temporary support and the release liner.

9. The method for applying a threadlike adhesive body according to claim 8, wherein the release liner has a lower peel adhesive force compared to the temporary support.

10. The method for applying a threadlike adhesive body according to claim 8, wherein the release liner is a surface of a second temporary support to which a second threadlike adhesive body is applied.

11. The method for applying a threadlike adhesive body according to claim 8, further comprising:
rolling-up the temporary support with the threadlike adhesive body applied to the surface of the temporary support facing the threadlike adhesive body,
wherein the release liner is a surface of the temporary support opposite to the surface to which the threadlike adhesive body is applied.

12. The method for applying a threadlike adhesive body according to claim 1, wherein
the threadlike adhesive body comprises a threadlike core material, coated in an adhesive layer covering a peripheral surface of the core material, and
the adhesive layer is between the core material and the surface of the temporary support facing the threadlike adhesive body.

13. A temporary-support-supported threadlike adhesive body for use in applying a threadlike adhesive body to an adherend so that the applied threadlike adhesive body has a desired shape,
wherein
the temporary-support-supported threadlike adhesive body comprises:
a temporary support having a first surface and a second surface opposite the first surface, wherein the first surface is embossed; and
a threadlike adhesive body applied to the first surface in a shape reverse to the desired shape, wherein the threadlike adhesive body was applied to the temporary support after heating the temporary support to a temperature in a range of 40-80° C.; and the first surface of the temporary support to which the threadlike adhesive body is applied has a peel adhesive force measured by a peel test of 0.30 N/50 mm or higher, the peel test comprising:

introducing 40 parts by weight of ion-exchanged water into a reaction vessel equipped with a cooling tube, a nitrogen introduction tube, a thermometer, and a stirrer and stirring for at least 1 hour at 60° C. while nitrogen gas is being introduced;

introducing 0.1 part by weight of 2,2'-azobis [N-(2-carboxyethyl)-2-methylpropionamidine] n-hydrate into the reaction vessel;

obtaining a monomer emulsion obtained by adding 98 parts by weight of 2-ethylhexyl acrylate, 1.25 parts by weight of acrylic acid, 0.75 parts by weight of methacrylic acid, 0.05 parts by weight of lauryl mercaptan, 0.02 parts by weight of γ-methacryloxypropyltrimethoxysilane, and 2 parts by weight of polyoxyethylene sodium lauryl sulfate to 30 parts by weight of ion-exchanged water to form a mixture and emulsifying the mixture, dropwise, into the reaction vessel over 4 hours while the reaction vessel is kept at 60° C.;

holding the reaction vessel at 60° C. for 3 hours and then cooling the reaction vessel to room temperature;

adding 10% by weight ammonia water to the reaction vessel to adjust the pH of the contents of the reaction vessel to obtain an acrylic-polymer emulsion that is an aqueous dispersion type acrylic polymer;

adding a tackifier-resin emulsion that is an aqueous emulsion of a polymerized-rosin ester having a softening point of 160° C. to the reaction vessel in an amount of 10 parts by weight on a solid basis per 100 parts by weight of the acrylic polymer contained in the obtained aqueous dispersion type acrylic polymer;

regulating the contents in the reaction vessel to have a pH of 7.2 and a viscosity of 10 Pa·s by using 10% by weight ammonia water as a pH regulator and poly (acrylic acid) as a thickener to obtain an aqueous dispersion type acrylic adhesive composition;

applying the obtained aqueous dispersion type acrylic adhesive composition to a polyethylene terephthalate (PET) substrate having dimensions of 700 mm×250 mm and a thickness of 25 μm with an applicator and drying the applied aqueous dispersion type acrylic adhesive composition at 100° C. for 2 minutes to form an adhesive layer having a thickness of 40 μm to obtain an adhesive tape for release-property evaluation;

bonding the second surface of the temporary support opposite to the first surface facing the threadlike adhesive body to a stainless steel plate using a double-faced adhesive tape;

cutting the adhesive tape for release-property evaluation into a size having a width of 50 mm and a length of 100 mm;

applying and press-bonding the cut adhesive tape for release-property evaluation by rolling a 2-kg roller forward and backward once, to the first surface of the temporary support to which the threadlike adhesive body is applied;

after sitting for 20 minutes subsequent to press-bonding the cut adhesive tape for release-property evaluation to the first surface of the temporary support to which the threadlike adhesive body is applied, the cut adhesive tape for release-property evaluation is peeled from the temporary support under the conditions of a peel angle of 180° and a peel rate of 300 mm/min to measure the peel adhesive force.

14. The temporary-support-supported threadlike adhesive body according to claim 13, wherein the threadlike adhesive body comprises a threadlike core material and an adhesive layer covering a peripheral surface of the core material.

15. The temporary-support-supported threadlike adhesive body according to claim 13, wherein the temporary-support-supported threadlike adhesive body further comprises:
   a release liner on the threadlike adhesive body with the threadlike adhesive body sandwiched between the temporary support and the release liner.

16. The temporary-support-supported threadlike adhesive body according to claim 15, wherein the release liner has a lower peel adhesive force compared to the temporary support.

17. The temporary-support-supported threadlike adhesive body according to claim 15, wherein the release liner is the second surface of a second temporary support to which a second threadlike adhesive body is applied.

18. The temporary-support-supported threadlike adhesive body according to claim 15, wherein the release liner is the second surface of the temporary support having been rolled-up with the threadlike adhesive body applied to the first surface of the temporary support.

19. The temporary-support-supported threadlike adhesive body according to claim 13, wherein
   the threadlike adhesive body comprises a threadlike core material, coated in an adhesive layer covering a peripheral surface of the core material, and
   the adhesive layer is between the core material and the surface of the temporary support facing the threadlike adhesive body.

* * * * *